US007962924B2

(12) United States Patent
Kuiper et al.

(10) Patent No.: US 7,962,924 B2
(45) Date of Patent: Jun. 14, 2011

(54) SYSTEM AND METHOD FOR CALL STACK SAMPLING COMBINED WITH NODE AND INSTRUCTION TRACING

(75) Inventors: Kean G. Kuiper, Round Rock, TX (US); Frank Eliot Levine, Austin, TX (US); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 11/759,588

(22) Filed: Jun. 7, 2007

(65) Prior Publication Data

US 2008/0307441 A1 Dec. 11, 2008

(51) Int. Cl.
*G06F 3/00* (2006.01)
*G06F 9/45* (2006.01)
(52) U.S. Cl. ............................ 719/321; 717/157; 710/52
(58) Field of Classification Search .................. 719/328, 719/321; 717/157; 710/52
See application file for complete search history.

(56) References Cited

U.S. PATENT DOCUMENTS

| | | | | |
|---|---|---|---|---|
| 5,768,500 | A | 6/1998 | Agrawal et al. | 395/184.01 |
| 6,560,773 | B1* | 5/2003 | Alexander et al. | 717/128 |
| 6,751,789 | B1 | 6/2004 | Berry et al. | 717/130 |
| 6,857,120 | B1 | 2/2005 | Arnold et al. | 717/157 |
| 7,200,695 | B2* | 4/2007 | Rosner | 710/52 |
| 2003/0005414 | A1 | 1/2003 | Elliot et al. | 717/128 |
| 2004/0148594 | A1 | 7/2004 | Williams | 717/158 |
| 2004/0215444 | A1* | 10/2004 | Patel et al. | 704/2 |
| 2005/0066322 | A1 | 3/2005 | Fink et al. | 717/151 |
| 2005/0210454 | A1 | 9/2005 | DeWitt, Jr. et al. | 717/133 |
| 2005/0283765 | A1 | 12/2005 | Warren et al. | 717/131 |
| 2006/0218543 | A1* | 9/2006 | Boger | 717/157 |
| 2008/0074433 | A1* | 3/2008 | Jiao et al. | 345/522 |
| 2008/0148240 | A1* | 6/2008 | Jones et al. | 717/130 |

OTHER PUBLICATIONS

Ravi Sharma, Distributed Application Development with Inferno, 1999.*
TDB v. 39 n. 4 04-96 pp. 155-158: "Algorithm for Drawing Hierarchical Representations of Asynchronous Traces".
Blake et al., "Simple and General Statistical Profiling with PCT," Proc. Usenix Technical Conference (Jun. 2002), pp. 205-217.

* cited by examiner

*Primary Examiner* — Lechi Truong
(74) *Attorney, Agent, or Firm* — VanLeeuwen & VanLeeuwen; Justin M. Dillon

(57) ABSTRACT

A system and method for Java™ call stack sampling combined with native sampling is presented. A kernel-mode device driver records and stores sampled context information that includes a program counter, a thread identifier, and a process identifier. The sampling thread receives a notification from the kernel-mode device driver, and proceeds to collect call stack information from a Java™ Virtual Machine. In turn, the sampling thread retrieves the sampled context information and harvests symbols corresponding to a loaded module. Once symbols are harvested, the sampling thread combines returned call stack nodes with native function leaf nodes into a unified output tree that provides the relationship between the two different node types. In one embodiment, the sampling thread may generate native function leaf nodes and the unified output tree in a post-processing manner.

14 Claims, 7 Drawing Sheets

SYSTEM AND METHOD FOR CALL STACK SAMPLING COMBINED WITH NODE AND INSTRUCTION TRACING

BACKGROUND OF THE INVENTION

1. Technical Field

The present invention relates to a system and method for Java™ call stack sampling combined with native sampling. More particularly, the present invention relates to a system and method for generating a unified output tree that includes returned call stack nodes and native function leaf nodes.

2. Description of the Related Art

Existing art provides limited capability to generate a complete call stack. A call stack includes information corresponding to active subroutines in a concise and organized manner. One approach to profiling execution is through a sampling profiler, such as a "tprof" executable, which is delivered with AIX™ (Advanced Interactive executive). The primary advantage of tprof is that there is minimal overhead required. A challenge found with tprof, however, is that although tprof provides native process information, it does not provide hierarchy. Another approach to profile execution is to attempt to retrieve a native call stack when taking a sample. However, this approach is typically not portable and does not include Java™ context.

Yet another approach to generate a call stack is through a Java™ profiler agent, which accepts entry/exit events generated by instrumentation built into a Java™ Virtual Machine (JVM), or JVM methods that are instrumented using byte code instrumentation. Both JVMPI (Java™ Virtual Machine Profiling Interface) and JVMTI (Java™ Virtual Machine Tool Interface) support entry/exit events. One disadvantage with this approach is that the profiler agent requires an extreme amount of overhead because it processes every entry/exit point. Another disadvantage with this approach is that it only provides information at the Java™ method level.

Kernel/device driver sampling based profilers may traverse a native stack, which provides a hierarchy, but does not include Java™ interpreted methods. Alternatively, application-based profilers may gain control at an operating system level granularity by setting an application level timer. However, these profilers may give biased results due to operating system scheduling algorithms. Both JVMPI and JVMTI provide an interface to retrieve call stacks that are internal to the JVM. Profilers may use these interfaces to retrieve Java™ call stacks, but the Java™ call stacks do not include the full context of native code that may be executing at the time of an interrupt. As a result, an application-based profiler may not identify a thread that was executing during the interrupt.

What is needed, therefore, is a system and method that effectively and efficiently generates complete call stack information.

SUMMARY

It has been discovered that the aforementioned challenges are resolved using a system and method for generating a unified output tree that includes returned call stack nodes and native function leaf nodes. A kernel-mode device driver records and stores sampled context information that includes interrupt context information, which includes a program counter, a thread identifier, and a process identifier. This information may include both kernel context and application context information as well as stack information, which may include calling sequences. The sampling thread receives a notification from the kernel-mode device driver, and proceeds to collect call stack information from a Java™ Virtual Machine. In turn, the sampling thread retrieves the sampled context information and harvests symbols corresponding to a loaded module. Once symbols are harvested, the sampling thread combines returned call stack nodes with native function leaf nodes into a unified output tree that provides the relationship between the two different node types.

A kernel-mode device driver receives scheduled hardware interrupts. At each interrupt, the device driver stores sampled context information and sends a notification to a sampling thread to begin a process of generating a unified output tree. For example, in Windows™-based operating systems, the notification may be a shared event or semaphore. After receiving the notification, the sampling thread retrieves the stored sampled context information and checks whether the process identifier included in the sampled context information is Java™-based. If so, the sampling thread sends a request, such as to a Java™ Virtual Machine (JVM), which provides returned call stack nodes to the sampling thread. The returned call stack nodes correspond to calling sequences that are known at run time. In turn, the sampling thread walks the returned call stack nodes to produce a unified output tree.

The sampling thread then determines the symbolic resolution of the program counter. If necessary, the sampling thread identifies the program counter's corresponding loaded module. Once identified, the sampling thread harvests symbolic information from the loaded module. If the program counter included in the sampled context information does not correspond to a current method, the sampling thread identifies symbols associated with the program counter, and stores them as native function leaf nodes in the unified output tree. As a result, the unified output tree includes a combination of returned call stack nodes and native function leaf nodes, which provides a compressive view of the relationship between executing Java™ methods and native processes. In one embodiment, the sampling thread may generate native function leaf nodes and generate the unified output tree in a post-processing manner.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
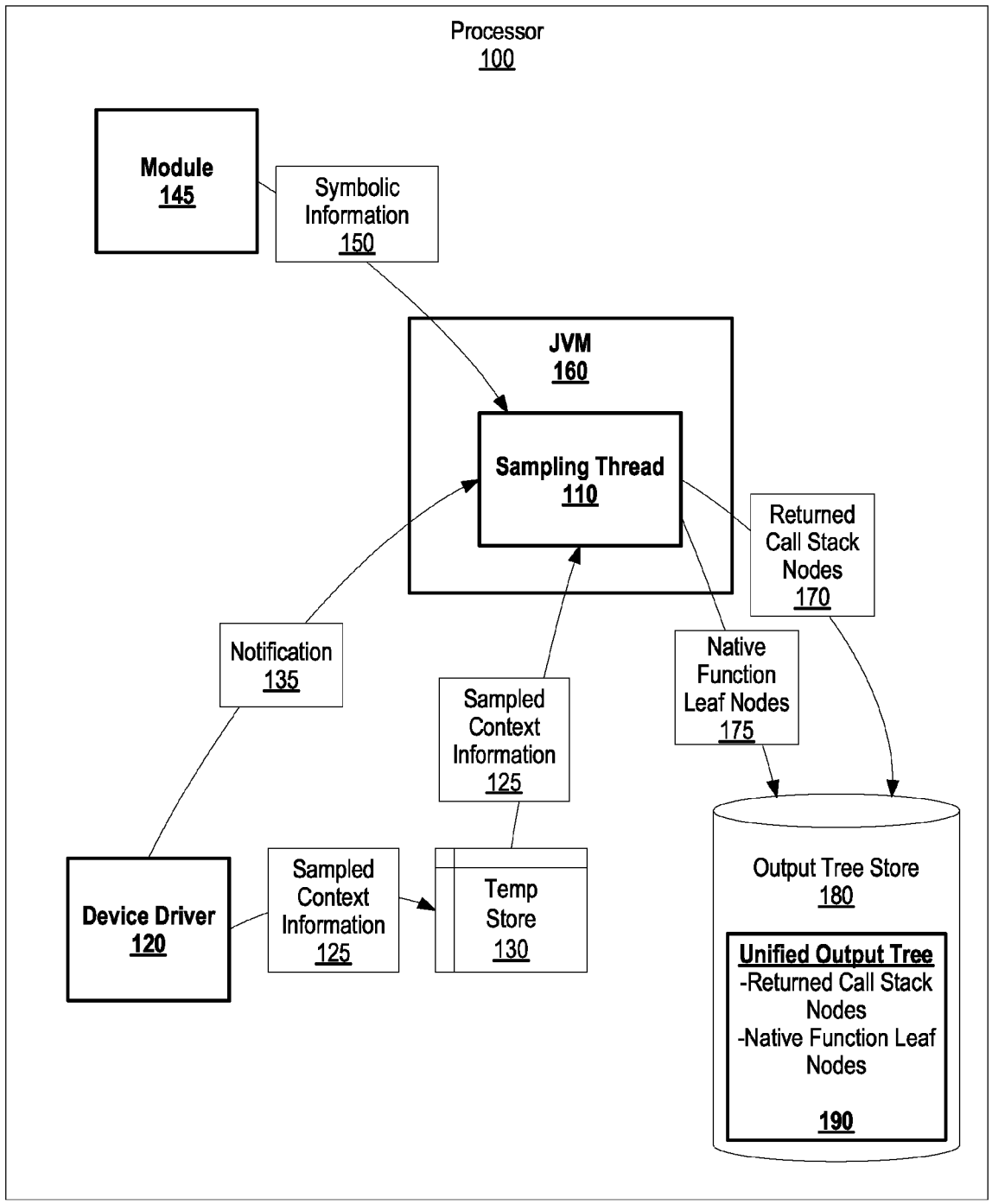
FIG. 1 is an exemplary diagram showing a sampling thread generating a unified output tree based upon call stack information and sampled context information.

FIG. 1 is a diagram showing a sampling thread generating a unified output tree based upon call stack information and sampled context information. Processor 100 includes device driver 120, such as a kernel-mode device driver. When interrupted at scheduled intervals, device driver 120 records and stores sampled context information 125 in temporary store 130. Sampled context information 125 includes native process information such as a program counter, a thread identifier, and a process identifier, which sampling thread subsequently uses to generate native function leaf nodes 175 (see FIGS. 4-6, and corresponding text for further details). Temporary store 130 may be stored on a volatile storage area, such as computer memory.

Once device driver 120 stores sampled context information 125 in temporary store 130, device driver 120 sends notification 135 to sampling thread 110, which notifies sampling thread 110 to begin a process of generating a unified output tree. For example, in Windows™-based operating systems, notification 135 may be a shared event or semaphore. After receiving notification 135, sampling thread 110 retrieves sampled context information 125 from temporary store 130. When the process identifier included in sampled context information 125 is Java™-based, sampling thread 110 sends a stack request to Java™ Virtual Machine (JVM) 160. In turn, JVM 160 sends call stack information back to sampling thread 110. Sampling thread 110 walks the call stack information into an output tree, and stores returned call stack nodes 170 in unified output tree 190 located in output tree store 180. Output tree store 180 may be stored on a nonvolatile storage area, such as a computer hard drive.

Figure 4:
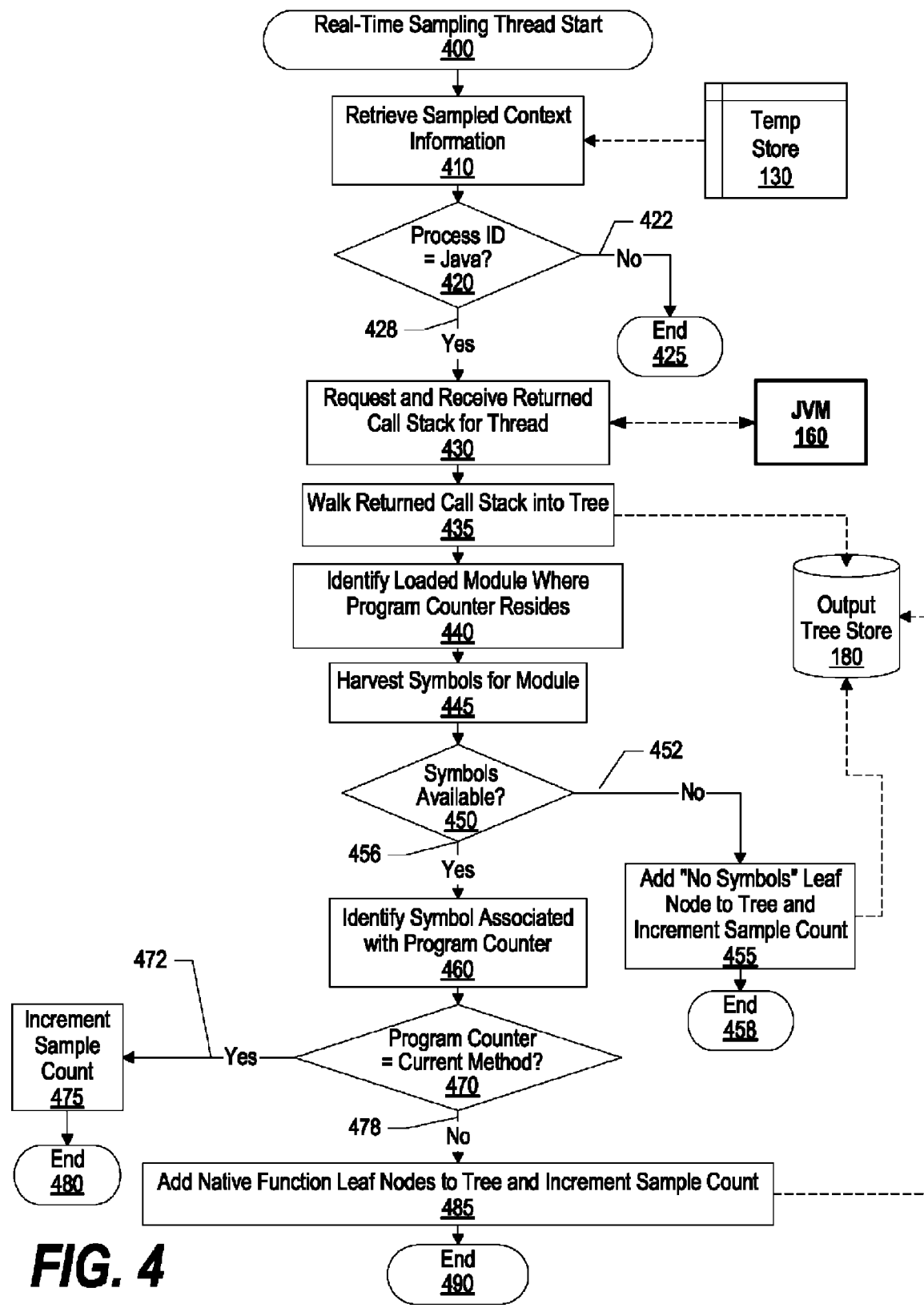
FIG. 4 is an exemplary flowchart showing steps taken in a user-mode sampling thread collecting call stack information and generating a unified output tree that includes returned call stack nodes and native function leaf nodes.
Figure 5:
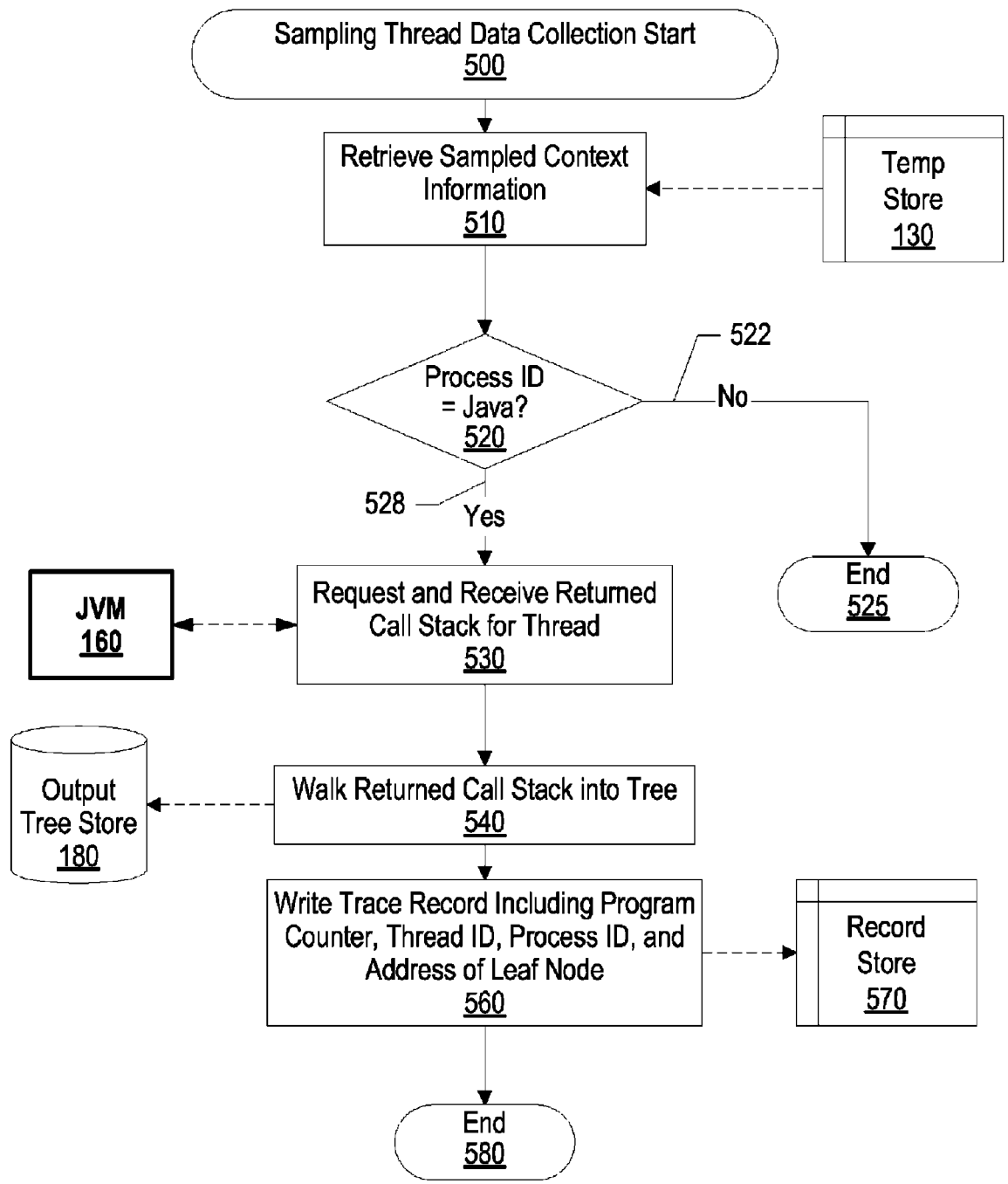
FIG. 5 is an exemplary flowchart showing steps taken in collecting call stack information for later unified output tree generation.
Figure 6:
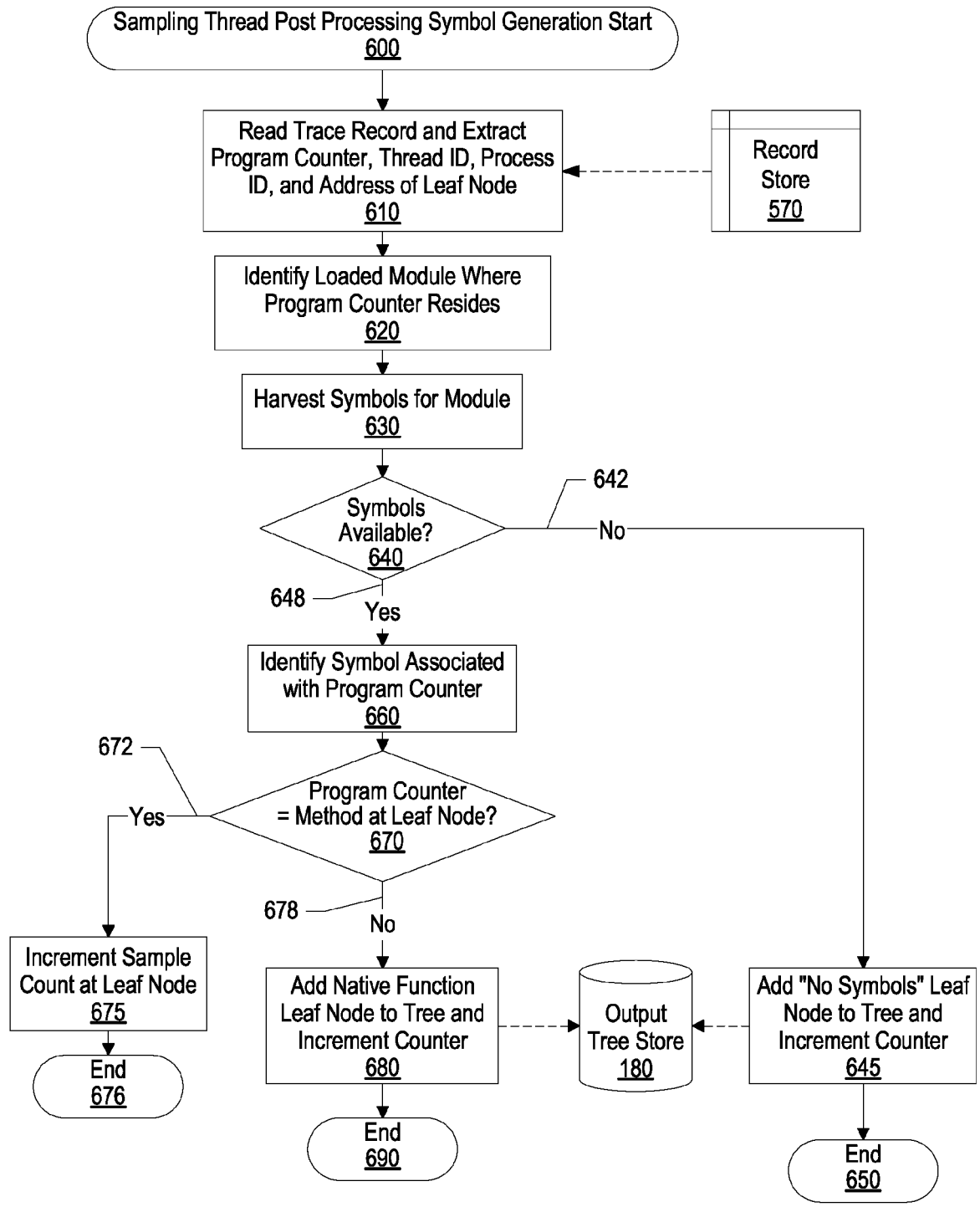
FIG. 6 is an exemplary flowchart showing steps taken in a user-mode sampling thread generating native function leaf nodes and including the native function leaf nodes in a unified output tree.

From this point on, sampling thread 110 may generate native function leaf nodes 175 in a real-time manner or post-processing manner (see FIGS. 4-6, and corresponding text for further details). When sampling thread 110 determines that the program counter included in sampled context information 125 does not correspond to a current method, sampling thread 110 identifies module 145, which corresponds to the program counter, and harvests symbolic information 150 from module 145. As one skilled in the art can appreciate, sampling thread 110 may retrieve symbolic information 150 from module 145 or from a different file that includes symbols (e.g., map files, .pdb files, etc.).

Sampling thread 110 identifies symbols associated with the program counter, and stores native function leaf nodes 175 in unified output tree 190 located in output tree store 180. As a result, unified output tree 190 includes a combination of returned call stack nodes and native function leaf nodes, which provides a comprehensive view of the relationship between executing Java™ methods and native subroutines. A sample count corresponding to the leaf node in the output tree (e.g., the routine executing where the sample occurred) is incremented that counts the number of samples taken. Reports may be generated to identify the base samples on each node as well as the accumulated samples, which indicate the sum of all the bases of nodes beneath the current node.

Figure 2A:
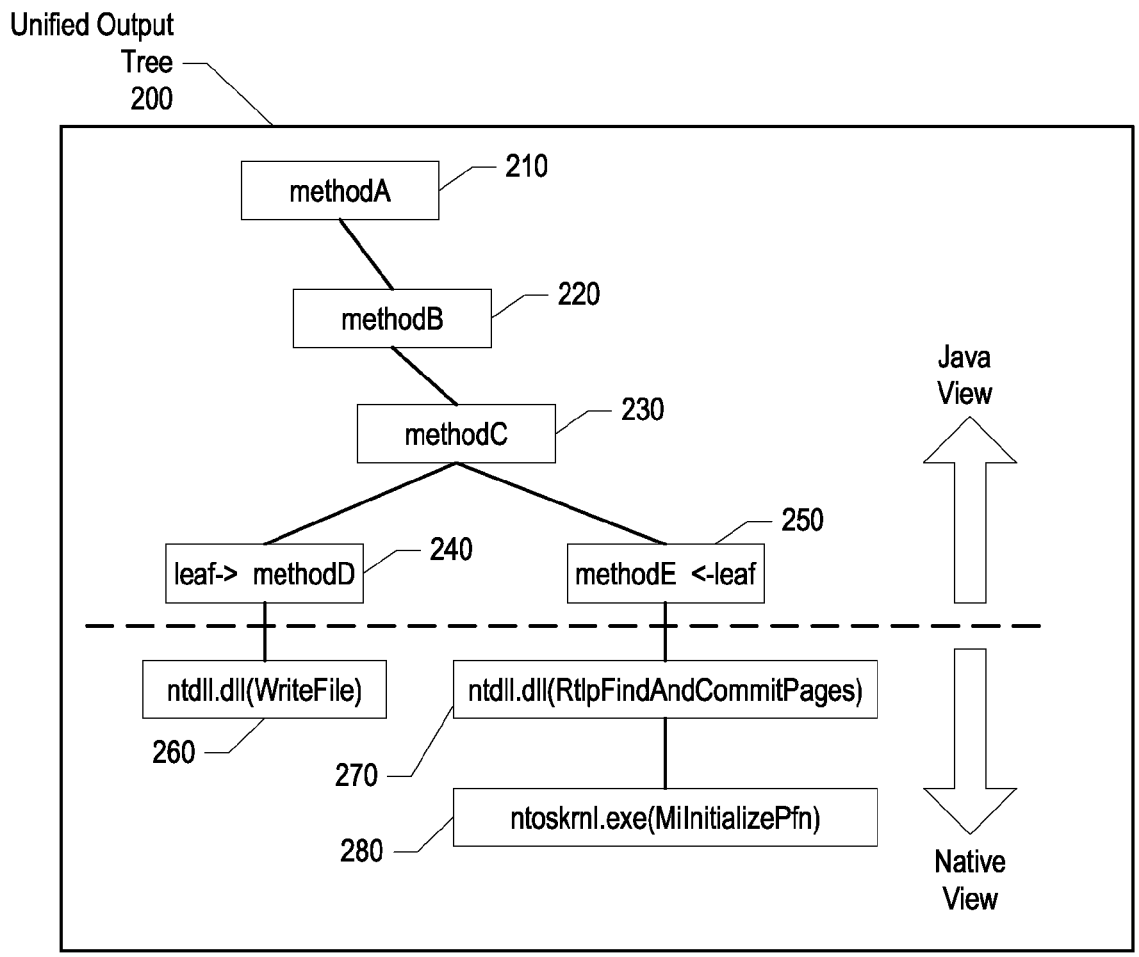
FIG. 2A is an exemplary diagram showing a unified output tree that includes returned call stack nodes and native function leaf nodes.

FIG. 2A is a diagram showing a unified output tree that includes returned call stack nodes and native function leaf nodes. A kernel-mode device driver collects and stores sampled context information that a sampling thread later retrieves to harvest and generate native function leaf nodes. In turn, the sampling thread generates unified output tree 200, which includes returned call stack nodes 210 through 250 along with native function leaf nodes 260 through 280. As can be seen, unified output tree 200 provides a comprehensive view of executing processes, both Java™-based processes as well as native processes.

Figure 2B:
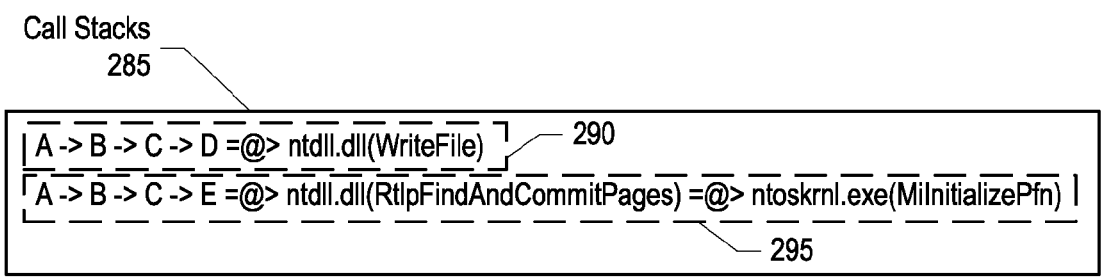
FIG. 2B is an exemplary diagram showing call stacks that include relationship information between returned call stack nodes and native function leaf nodes.

FIG. 2B is a diagram showing call stacks that include relationship information between returned call stack nodes and native function leaf nodes. Call stacks 285 include call stack 290 and call stack 295. Call stack 290 shows that method A called method B; method B called method C; method C called method D; and that "ntdll.dll(WriteFile)" is the native routine that is currently executing. Referring back to FIG. 2A, call stack 290 includes the path from call stack node 210 to symbol leaf node 260.

Call stack 295 shows that method A called method B; method B called method C; method C called method E; and that "ntdll.dll(RtlpFindAndCommitPages)" and "ntoskrnl.exe(MiInitializedPfn) executing in the kernel" are native subroutines that are currently executing. Referring to FIG. 2A, call stack 295 includes the path from call stack node 210 to symbol leaf node 280. Since the Java™ application context is separate from the kernel context, we can add kernel context stack information under the application context information.

Figure 3:
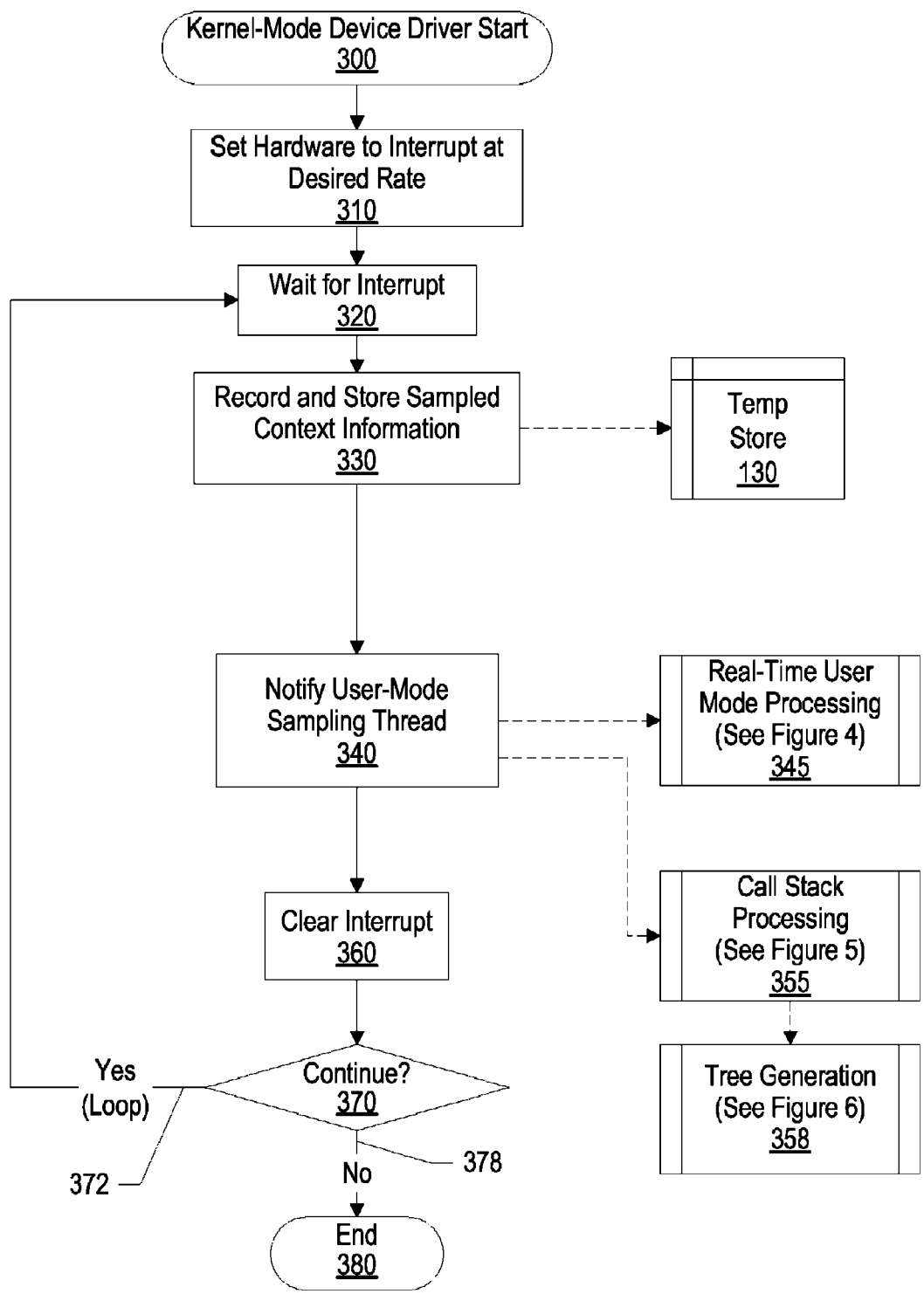
FIG. 3 is an exemplary flowchart showing steps taken in a kernel-mode driver recording sampled context information and notifying a user-mode sampling thread to generate a unified output tree.

FIG. 3 is a flowchart showing steps taken in a kernel-mode driver recording sampled context information and notifying a user-mode sampling thread to generate a unified output tree.

Processing commences at 300, whereupon processing sets hardware to interrupt at a particular sampling rate (step 310) and, at step 320, the kernel-mode device driver waits for the hardware interrupt. Once the kernel-mode device driver detects the interrupt, the kernel-mode device driver records and stores sampled context information in temporary store 130. The sampled context information includes native process information such as a program counter, a thread identifier, and a process identifier, which are used by a user-mode sampling thread to generate native function leaf nodes (see FIGS. 4-6, and corresponding text for further details). Temporary store 130 is the same as that shown in FIG. 1.

At step 340, the kernel-mode device driver notifies a user-mode sampling thread to collect call stack information and generate a unified output tree. In one embodiment, the user-mode sampling thread may generate the unified output tree in real time (pre-defined process block 345, see FIG. 4 and corresponding text for further details). In another embodiment, the user-mode sampling thread may collect call stack information in real-time, and generate the unified output tree at a later time (pre-defined process blocks 355 and 358, see FIGS. 5, 6, and corresponding text for further details).

Processing clears the hardware interrupt at step 360, and a determination is made as to whether to continue processing interrupts (decision 370). If processing should continue, decision 370 branches to "Yes" branch 372, which loops back to wait for and process another interrupt. This looping continues until processing should terminate, at which point decision 370 branches to "No" branch 378 whereupon processing ends at 380.

FIG. 4 is a flowchart showing steps taken in a user-mode sampling thread collecting call stack information and generating a unified output tree that includes returned call stack nodes and native function leaf nodes.

Sampling thread processing commences at 400, whereupon the sampling thread retrieves sampled context information from temporary store 130 (step 410). The sampled context information, which includes a program counter, a thread identifier, and a process identifier, was previously stored by a kernel-mode device driver (see FIG. 3 and corresponding text for further details). Temporary store 130 is the same as that shown in FIG. 1.

A determination is made as to whether the process identifier included in the sampled context information is Java™-based (decision 420). If the process identifier is not Java™-based, decision 420 branches to "No" branch 422 whereupon processing ends at 425. On the other hand, if the process identifier is a Java™-based identifier, decision 420 branches to "Yes" branch 428 whereupon the sampling thread requests and receives call stack information from Java™ Virtual Machine (JVM) 160 at step 430. As one skilled in the art can appreciate, JVM 160's call stack information corresponds to processes executed by JVM 160. JVM 160 is the same as that shown in FIG. 1.

At step 435, the sampling thread walks the call stack information to produce a unified output tree located in output tree store 180, thus creating call stack nodes from the call stack information. Output tree store 180 is the same as that shown in FIG. 1.

Processing identifies a loaded module corresponding to the program counter included in the retrieved sampled context information (step 440). Once identified, the sampling thread harvests symbols for the module at step 445. As one skilled in the art can appreciate, processing may load module symbols into an "Address to Name" (A2N) work area. In addition, the symbols may be retrieved from the module itself, or the symbols may be retrieved from a different file that includes symbols (e.g., map files, .pdb files, etc.).

A determination is made as to whether there were symbols that were harvested (decision 450). If no symbols were harvested, decision 450 branches to "No" branch 452 whereupon the sampling thread adds a "No Symbols" leaf node to the unified output tree located in output tree store 180 that includes the call stack nodes, along with incrementing a sample count corresponding to the leaf node (step 455). Processing ends at 458.

On the other hand, if symbols were harvested, decision 450 branches to "Yes" branch 456 whereupon processing identifies symbols associated with the program counter at step 460, which corresponds to currently executing native processes. A determination is made as to whether the program counter included in the retrieved sampled context information corresponds to the current method (decision 470). If the program counter corresponds to the current method, decision 470 branches to "Yes" branch 472 whereupon processing increments a sample count corresponding to the node at step 475, and processing ends at 480.

On the other hand, if the program counter does not correspond to the current method, decision 470 branches to "No" branch 478 whereupon, at step 485, processing adds the symbols as native function leaf nodes and integrates them into with returned call stack nodes included in the unified output tree, along with incrementing a sample count corresponding to the leaf node, in output tree store 180. Thus, the unified output tree includes two node types, which are returned call stack nodes and native function leaf nodes (see FIG. 2A, 2B, and corresponding text for further details). Processing returns at 495.

FIG. 5 is a flowchart showing steps taken in collecting call stack information for later unified output tree generation. FIG. 5 is similar to FIG. 4 with the exception that the sampling thread performs native symbol generation and tree generation at a time different than call stack information collection. The embodiment shown in FIG. 5 may be used in situations to reduce real-time overhead since symbol gathering may interfere with an application being measured. For long running applications and samples, however, overhead associated with gathering the symbolic information may be reduced because the symbols are already gathered.

Processing commences at 500, whereupon the sampling thread retrieves sampled context information from temporary store 130 (step 510). Again, a kernel-mode device driver previously stored the sampled context information, which includes a program counter, a thread identifier, and a process identifier (see FIG. 3 and corresponding text for further details). Temporary store 130 is the same as that shown in FIG. 1.

A determination is made as to whether the process identifier included in the sampled context information is Java™-based (decision 520). If the process identifier is not a Java™-based identifier, decision 520 branches to "No" branch 522 whereupon processing ends at 525. On the other hand, if the process identifier is a Java™-based identifier, decision 520 branches to "Yes" branch 528 whereupon the sampling thread requests and receives call stack information from Java™ Virtual Machine (JVM) 160 at step 530. JVM 160 is the same as that shown in FIG. 1.

At step 540, the sampling thread walks the call stack information to produce a unified output tree located in output tree store 180, thus creating call stack nodes from the call stack information. Output tree store 180 is the same as that shown in FIG. 1.

The sampling thread writes a trace record to record store 570, which includes the program counter, thread identifier, process identifier, and address of the leaf node, which is an address corresponding to the leaf node of the original stack that JVM 160 receives (step 560). Record store 570 may be stored on a volatile storage area, such as computer memory. Processing ends at 580.

The sampling thread repeats the steps shown in FIG. 5 each time the kernel-mode device driver calls the sampling thread. At some specified point, the sampling thread retrieves the information stored in record store 570, generates native function leaf nodes, and includes the native function leaf nodes, along with returned call stack nodes, in the unified output tree stored in output tree store 180 (see FIG. 6 and corresponding text for further details). For example, in a normal run, an analyst may issue a start command, generate report command, or a stop profiling command. In another example, for real-time symbolic information, a warm up period may occur such that symbols are gathered for the native code, but no trees are actually built.

FIG. 6 is a flowchart showing steps taken in a user-mode sampling thread generating native function leaf nodes and including the native function leaf nodes in a unified output tree. Processing commences at 600, whereupon processing reads a previously stored trace record from record store 570, which includes a program counter, thread identifier, process identifier, and address of the leaf node (step 610). At step 620, processing identifies a loaded module corresponding to the program counter included in the retrieved sampled context information. Once identified, the sampling thread harvests symbols for the module at step 630. Record store 570 is the same as that shown in FIG. 5.

A determination is made as to whether there were symbols that were harvested (decision 640). If no symbols were harvested, decision 640 branches to "No" branch 642 whereupon the sampling thread adds a "No Symbols" leaf node to the unified output tree located in output tree store 180 that includes the call stack nodes, along with incrementing a sample count corresponding to the leaf node (step 645). Processing ends at 650 (see FIG. 5 and corresponding text for further details). Output tree store 180 is the same as that shown in FIG. 1.

On the other hand, if symbols were harvested, decision 640 branches to "Yes" branch 648 whereupon processing identifies symbols associated with the program counter at step 660, which corresponds to currently executing native processes. A determination is made as to whether the retrieved program counter corresponds to the current method (decision 670). If the program counter corresponds to the current method, native symbol resolution is not required and decision 670 branches to "Yes" branch 672, whereupon processing increments a sample count corresponding to the node at step 675, and processing ends at 676.

On the other hand, if the program counter does not correspond to a currently executed method, decision 670 branches to "No" branch 678 whereupon processing adds the symbols as native function leaf nodes to the unified output tree included in output tree store 180 and increments a sample count corresponding to the leaf node (step 680). Thus, the unified output tree includes two node types, which are returned call stack nodes and native function leaf nodes (see FIG. 2A, 2B, and corresponding text for further details). Processing ends at 690.

Figure 7:
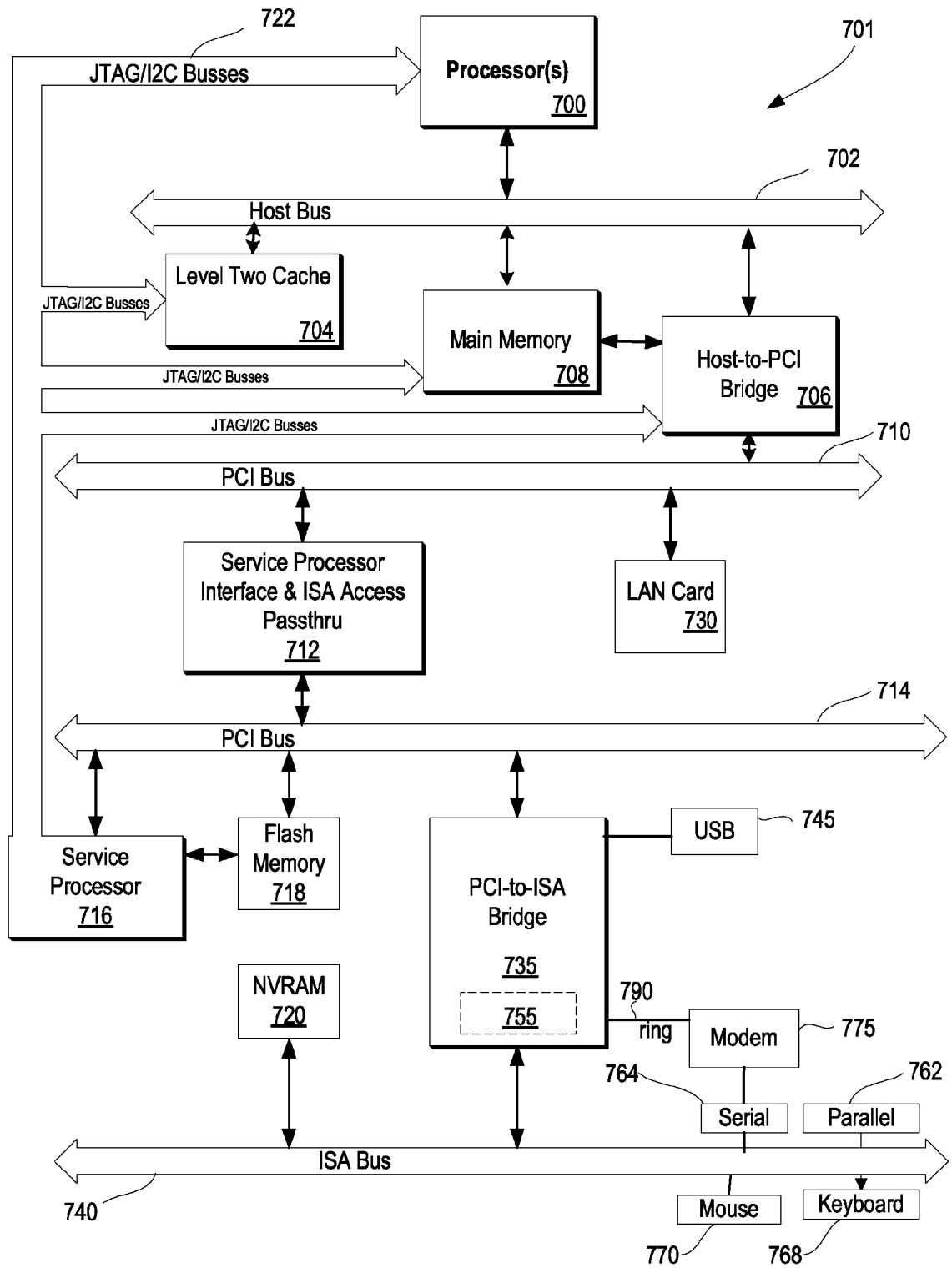
FIG. 7 is an exemplary block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer operable storage media, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving an interrupt at a device driver executing on a processor;
in response to receiving the interrupt, storing, by the device driver, sampled context information that corresponds to a native process that is executing on the processor;
in response to storing the sampled context information, using the device driver to notify a sampling thread;
in response to being notified, using the sampling thread to identify one or more returned call stack nodes;
correlating, using the sampling thread, the returned call stack nodes with the sampled context information, the correlating further comprising:
identifying, based upon the sampled context information, one or more native function leaf nodes that correspond to the native process; and
integrating the native function leaf nodes with the returned call stack nodes, the integrating resulting in a unified output tree; and
storing the unified output tree.

2. The method of claim 1 wherein the sampled context information comprise a program counter, a thread identifier, and a process identifier, the method further comprising:
- identifying a loaded module corresponding to the program counter; and
- harvesting one or more symbols for the loaded module.

3. The method of claim 2 further comprising:
- determining that the program counter does not correspond to a current method; and
- performing the integration of the native function leaf nodes with the returned call stack nodes in response to determining that the program counter does not correspond to the current method.

4. The method of claim 1 wherein the integrating results in coupling one or more of the native function leaf nodes to one or more of the returned call stack nodes.

5. The method of claim 1 further comprising:
- incrementing a sample count in the unified output tree.

6. The method of claim 1 wherein call stack information corresponding to the returned call stack nodes is received from a Java™ Virtual Machine.

7. The method of claim 1 wherein the notification includes the device driver sending a notification to the sampling thread.

8. A computer program product stored on a computer operable storage media, the computer operable media containing instructions for execution by a computer, which, when executed by the computer, cause the computer to implement a method of generating call stack information, the method comprising:
- receiving an interrupt at a device driver executing on a processor;
- in response to receiving the interrupt, storing, by the device driver, sampled context information that corresponds to a native process that is executing on the processor;
- in response to storing the sampled context information, using the device driver to notify a sampling thread;
- in response to being notified, using the sampling thread to identify one or more returned call stack nodes;
- correlating, using the sampling thread, the returned call stack nodes with the sampled context information, the correlating further comprising:
  - identifying, based upon the sampled context information, one or more native function leaf nodes that correspond to the native process; and
  - integrating the native function leaf nodes with the returned call stack nodes, the integrating resulting in a unified output tree; and
- storing the unified output tree.

9. The computer program product of claim 8 wherein the sampled context information comprise a program counter, a thread identifier, and a process identifier, the method further comprising:
- identifying a loaded module corresponding to the program counter; and
- harvesting one or more symbols for the loaded module.

10. The computer program product of claim 9 wherein the method further comprises:
- determining that the program counter does not correspond to a current method; and
- performing the integration of the native function leaf nodes with the returned call stack nodes in response to determining that the program counter does not correspond to the current method.

11. The computer program product of claim 8 wherein the integrating results in coupling one or more of the native function leaf nodes to one or more of the returned call stack nodes.

12. An information handling system comprising:
- one or more processors;
- a memory accessible by the processors;
- one or more nonvolatile storage devices accessible by the processors; and
- a set of instructions stored in the memory, wherein one or more of the processors executes the set of instructions in order to perform actions of:
  - receiving an interrupt at a device driver executing on one of the processors;
  - in response to receiving the interrupt, storing, by the device driver, sampled context information that corresponds to a native process that is executing on one of the processors;
  - in response to storing the sampled context information, using the device driver to notify a sampling thread;
  - in response to being notified, using the sampling thread to identify one or more returned call stack nodes;
  - correlating, using the sampling thread, the returned call stack nodes with the sampled context information, the correlating further comprising:
    - identifying, based upon the sampled context information, one or more native function leaf nodes that correspond to the native process; and
    - integrating the native function leaf nodes with the returned call stack nodes, the integrating resulting in a unified output tree; and
  - storing the unified output tree in one of the nonvolatile storage devices.

13. The information handling system of claim 12 wherein the sampled context information comprise a program counter, a thread identifier, and a process identifier, further comprising an additional set of instructions in order to perform actions of:
- identifying a loaded module corresponding to the program counter; and
- harvesting one or more symbols for the loaded module.

14. The information handling system of claim 13 further comprising an additional set of instructions in order to perform actions of:
- determining that the program counter does not correspond to a current method; and
- performing the integration of the native function leaf nodes with the returned call stack nodes in response to determining that the program counter does not correspond to the current method.

* * * * *